(12) United States Patent
Chao

(10) Patent No.: US 9,227,348 B2
(45) Date of Patent: Jan. 5, 2016

(54) METHOD FOR FORMING A GLASS-PLASTIC COMPOSITE

(75) Inventor: Kuang-Cheng Chao, New Taipei (TW)

(73) Assignee: Ocean Net, Inc., New Taipei (TW)

( * ) Notice: Subject to any disclaimer, the term of this patent is extended or adjusted under 35 U.S.C. 154(b) by 1045 days.

(21) Appl. No.: 13/238,846

(22) Filed: Sep. 21, 2011

(65) Prior Publication Data

US 2013/0071635 A1 Mar. 21, 2013

(51) Int. Cl.
*B29C 45/14* (2006.01)
*B32B 17/06* (2006.01)
*B29C 70/68* (2006.01)
*B29C 70/78* (2006.01)
*B29K 709/08* (2006.01)
*B29L 31/00* (2006.01)

(52) U.S. Cl.
CPC ......... *B29C 45/14811* (2013.01); *B29C 70/683* (2013.01); *B29C 70/78* (2013.01); *B32B 17/064* (2013.01); *B29K 2709/08* (2013.01); *B29K 2715/006* (2013.01); *B29L 2031/722* (2013.01); *Y10T 428/24851* (2015.01)

(58) Field of Classification Search
None
See application file for complete search history.

(56) References Cited

U.S. PATENT DOCUMENTS

| | | | | | |
|---|---|---|---|---|---|
| 4,963,413 | A | * | 10/1990 | Amano | 428/192 |
| 5,707,473 | A | * | 1/1998 | Agrawal et al. | 156/245 |
| 7,850,805 | B2 | * | 12/2010 | Vardon | 156/85 |
| 2005/0091935 | A1 | * | 5/2005 | Amano et al. | 52/204.591 |
| 2010/0159183 | A1 | * | 6/2010 | Nishimura | 428/77 |
| 2012/0295094 | A1 | * | 11/2012 | Chiang et al. | 428/307.3 |

* cited by examiner

*Primary Examiner* — Edmund Lee
(74) *Attorney, Agent, or Firm* — Brinks Gilson & Lione

(57) ABSTRACT

Disclosed is a method for forming a glass-plastic composite which includes the steps of: a) activating a first surface of a glass substrate, b) applying an adhesive material on the first surface that has been activated to form an adhesive layer on the first surface, and c) placing the glass substrate together with the adhesive layer in a mold and injection molding a plastic material over the adhesive layer. A glass-plastic composite made according to the method is also disclosed.

10 Claims, 6 Drawing Sheets

METHOD FOR FORMING A GLASS-PLASTIC COMPOSITE

BACKGROUND OF THE INVENTION

1. Field of the Invention

The invention relates to a method for forming a glass-plastic composite, and more particularly to a method for forming a glass-plastic composite by injection molding. The invention also relates to a glass-plastic composite made according to the method.

2. Description of the Related Art

In consumer electronics products (for example, mobile phones, electronic appliances, computers, or the like), parts of vehicles, or toys, an outer casing thereof is usually made of glass, metal or plastic. When the outer casing is made from a glass substrate, a plastic material is usually combined with the glass substrate so as to obtain balanced properties of the plastic and glass materials.

Conventionally, the plastic material is bonded to the glass substrate using an adhesive. Specifically, the adhesive is applied on the plastic material or the glass substrate, followed by positioning the plastic material relative to the glass substrate, heating the adhesive, and compressing the plastic material against the glass substrate. The processing procedure using the adhesive is relatively complicated. Furthermore, it is difficult to control the precision of positioning the plastic material relative to the glass substrate.

In view of the aforesaid, it is desirable in the art to provide an improved method for bonding a plastic material to a glass substrate.

SUMMARY OF THE INVENTION

An object of the present invention is to provide a method for forming a glass-plastic composite which is relatively simple and which provides sufficient bonding strength between the plastic and the glass.

Another object of the present invention is to provide a glass-plastic composite made according to the method of the present invention.

In one aspect of this invention, a method for forming a glass-plastic composite includes the steps of:
  a) activating a first surface of a glass substrate;
  b) applying an adhesive material on the first surface that has been activated to form an adhesive layer on the first surface; and
  c) placing the glass substrate together with the adhesive layer in a mold, and injection molding a plastic material over the adhesive layer.

In another aspect of this invention, a glass-plastic composite produced by the method of the present invention includes a glass substrate having an activated first surface, an adhesive layer bonded to the activated first surface of the glass substrate, and a plastic layer bonded to the adhesive layer.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
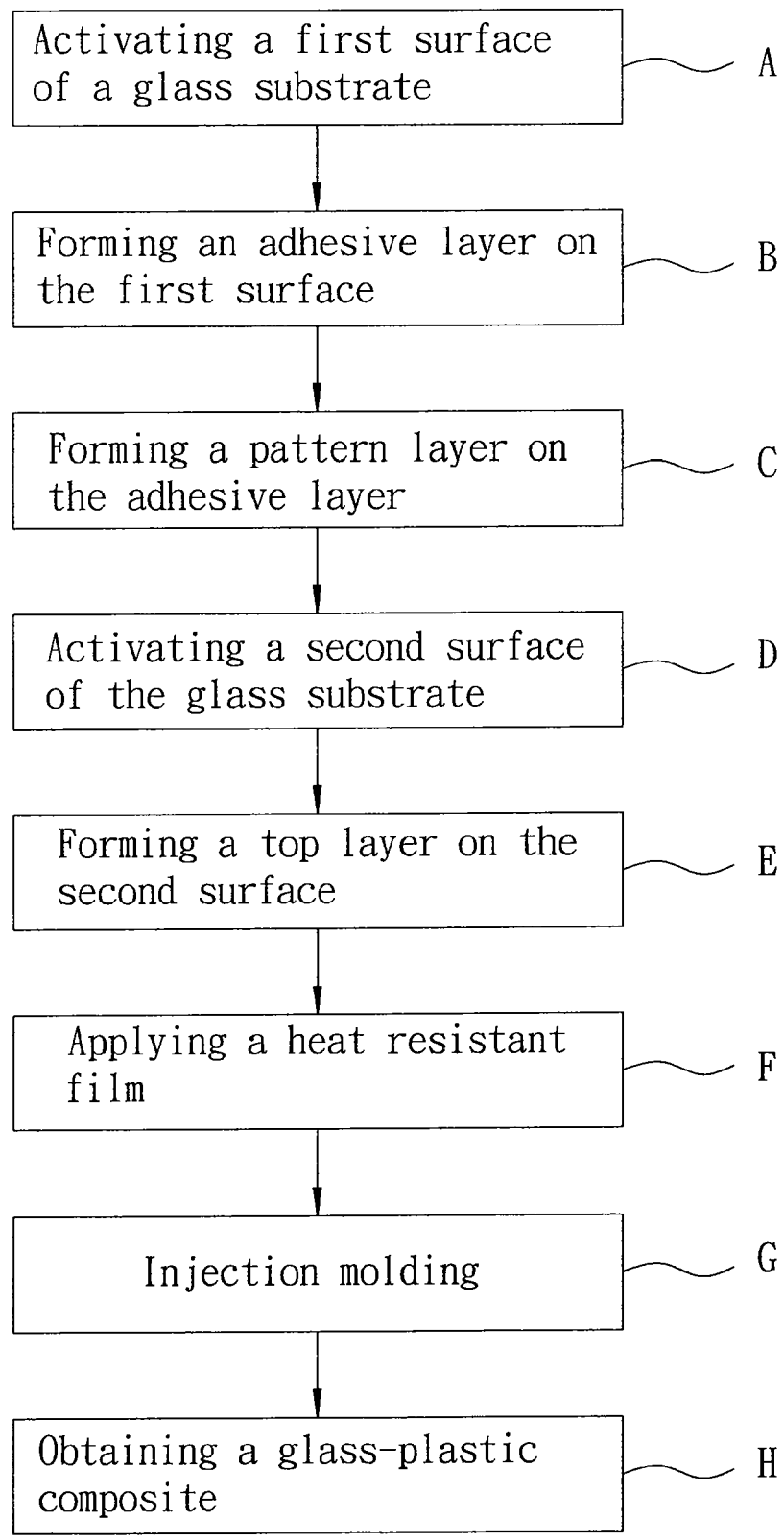
FIG. 1 is a flow chart of a preferred embodiment of a method for forming a glass-plastic composite according to the present invention.
Figure 2:
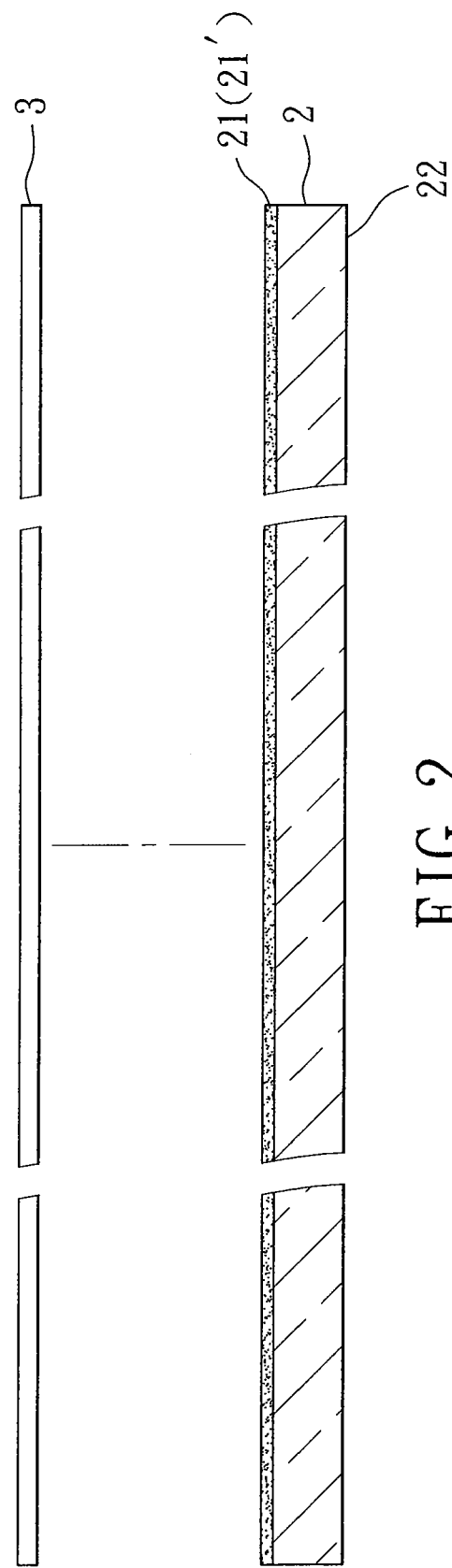
FIGS. 2 to 5 are fragmentary sectional views illustrating consecutive steps of the preferred embodiment.

Referring to FIGS. 1 to 5, the preferred embodiment of a method for forming a glass-plastic composite according to the present invention includes the steps of:

A) Activating a First Surface 21 of a Glass Substrate 2:

Specifically referring to FIG. 2, the glass substrate 2 has a first surface 21 and a second surface 22 opposite to the first surface 21. The first surface 21 of the glass substrate 2 is activated by any suitable process well known in the art, such as an etching treatment, a plasma treatment, an ultraviolet treatment, a dipping treatment with a chemical agent, a coating treatment with an activation agent, or the like. When the first surface 21 of the glass substrate 2 is activated by the etching treatment, the plasma treatment, or the dipping treatment with a chemical agent, the first surface 21 of the glass substrate 2 is formed with recesses having a depth of up to 20 µm. When the first surface 21 of the glass substrate 2 is activated by the coating treatment with an activation agent, the first surface 21 of the glass substrate 2 is formed with an activated layer (21') having a thickness of up to 20 µm. When the first surface 21 of the glass substrate 2 is activated by the ultraviolet treatment, the first surface 21 of the glass substrate 2 is formed with free radicals for enhancing the subsequent bonding.

Figure 3:
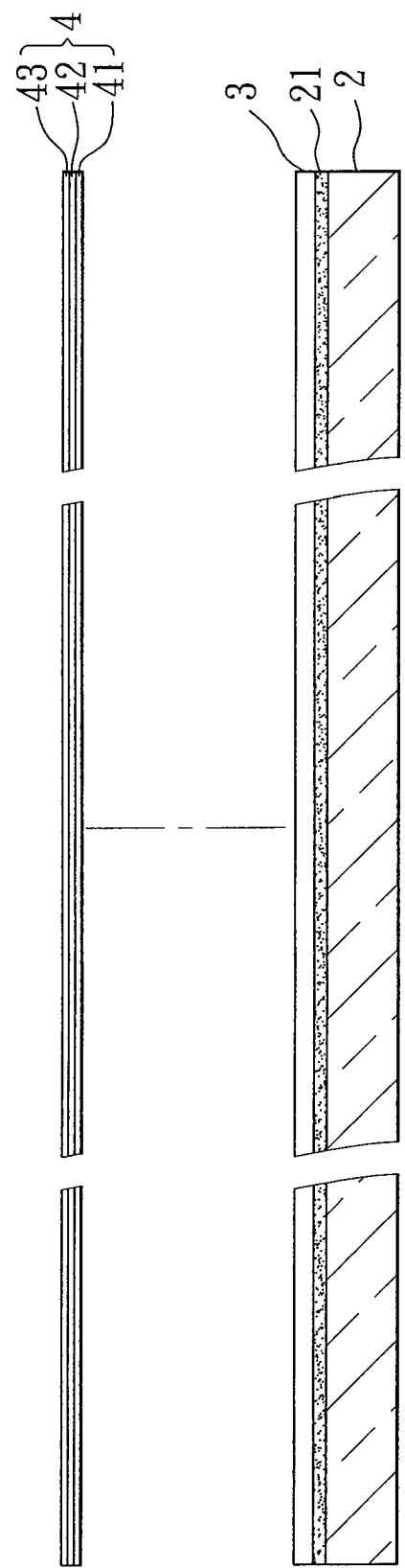

B) Forming an Adhesive Layer 3 on the First Surface 21:

Specifically referring to FIGS. 2 and 3, an adhesive material is applied on the first surface 21 that has been activated to form the adhesive layer 3 on the first surface 21 of the glass substrate 2. In the preferred embodiment, the adhesive layer 3 is formed by screen printing. In addition to screen printing, application of the adhesive material can be conducted via digital jet printing, spray coating, dipping, or the like. The adhesive layer 3 has a thickness ranging from 1 µm to 100 µm. The adhesive material suitable for the present invention includes urea-formaldehyde resin, acrylate resin, epoxy resin, UV curing resin, polyurethane, melamine-formaldehyde resin, or combinations thereof.

Figure 4:
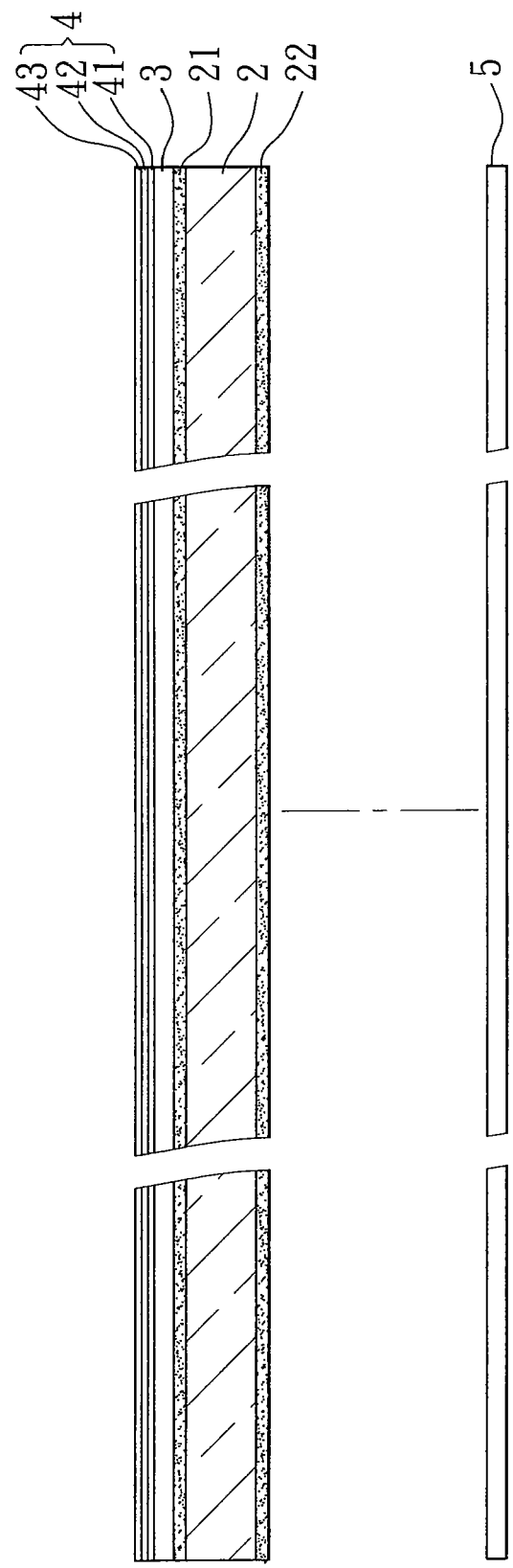

C) Forming a Pattern Layer 4 on the Adhesive Layer 3:

Specifically referring to FIGS. 3 and 4, the pattern layer 4 is formed on the adhesive layer 3. In the preferred embodiment, the pattern layer 4 is formed by applying a pattern-forming material, such as inks, pigments, or the like, on the adhesive layer 3 by digital jet printing to form a pattern portion 41 followed by applying a background color material, for example, a white color ink, on the pattern portion 41 by digital jet printing to form a background color layer 42 on the pattern portion 41, and then by applying a binder on the background color layer 42 by screen printing to form a binding layer 43 on the background color layer 42. Alternatively, the pattern portion 41 and the background color layer 42 can be formed via screen printing, sublimation transfer-printing, or the like, and the binding layer 43 can be formed via digital jet printing, spray printing, or the like.

The pattern layer 4 has a thickness ranging from 10 µm to 300 µm. The pattern portion 41 can be in a form of figures, characters, or the like. Optionally, decorative material, such as gold powder, silver powder, pearl powder, or the like can be added into the background color layer 42 so as to enhance the aesthetic effect. The binding layer 43 is made of urea-formaldehyde resin, acrylate resin, hot melt adhesive, epoxy resin, amino resin, phenolic formaldehyde resin, UV curing resin, vinyl ester resin, polyvinyl acetate, polyurethane, melamine-formaldehyde resin, or combinations thereof.

D) Activating the Second Surface 22 of the Glass Substrate 2:

Specifically referring to FIG. 4, the second surface 22 of the glass substrate 2 is activated by the etching treatment, the plasma treatment, the ultraviolet treatment, the dipping treatment with a chemical agent, or the coating treatment with an activation agent.

E) Forming a Top Layer 5 on the Second Surface 22 of the Glass Substrate 2:

The top layer 5 can be formed on the second surface 22 that has been activated by screen printing, digital jet printing, spray coating, or the like. The top layer 5 is usually made of a protective ink so as to form a transparent protective layer on the pattern layer 4. Any other suitable ink can be used according to any specific surface effect requirement. The thickness of the top layer 5 ranges from 1 μm to 50 μm.

Figure 5:
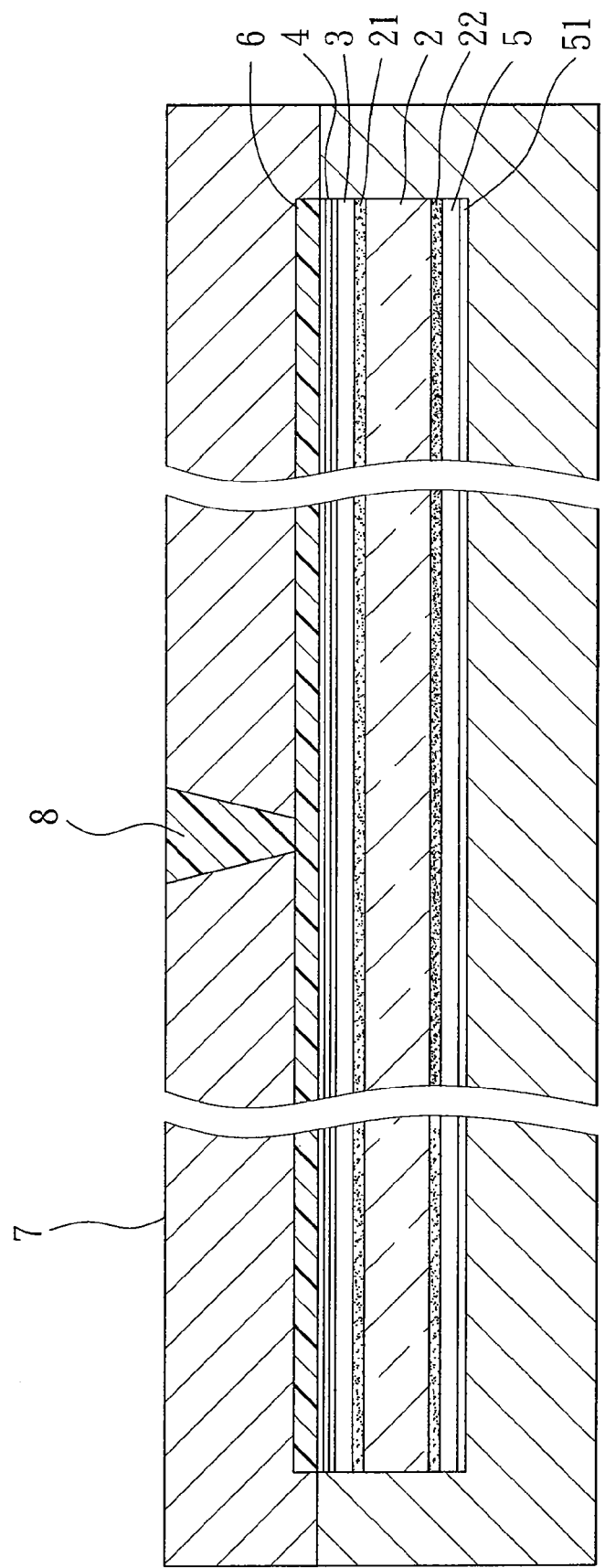

F) Applying a Heat Resistant Film 51:

Specifically referring to FIG. 5, the heat resistant film 51 is applied on the top layer 5. The heat resistant film 51 is made of any suitable heat resistant material, such as silicone rubber, polyethylene terephthalate, polycarbonate, polyvinyl chloride, or the like.

G) Injection Molding:

Specifically referring to FIGS. 4 and 5, the glass substrate 2 together with the adhesive layer 3, the pattern layer 4, the top layer 5, and the heat resistant film 51 is placed in a mold 7. A plastic layer 6 is integrated with and formed on the binding layer 43 of the pattern layer 4 by injection molding a plastic material 8 over the pattern layer 4 at a molding temperature ranging from 60° C. to 300° C. for a period ranging from 1 second to 600 seconds. The shape and the thickness of the plastic layer 6 can be varied according to specific requirements for a glass-plastic composite to be produced. Alternatively, the plastic layer 6 can be integrated with and formed on the adhesive layer 3 by injection molding when the pattern layer 4 is not included.

The plastic material 8 suitable for the present invention is polycarbonate, acrylonitrile-butadiene-styrene copolymer, polymethyl methacrylate, polybutyl terephthalate, polyethylene terephthalate, polyoxymethylene, polyphenylene sulfide, Nylon 66, or combinations thereof.

H) Obtaining a Glass-Plastic Composite:

A glass-plastic composite is obtained after removing from the mold 7 and stripping of the heat resistant film 51.

Figure 6:
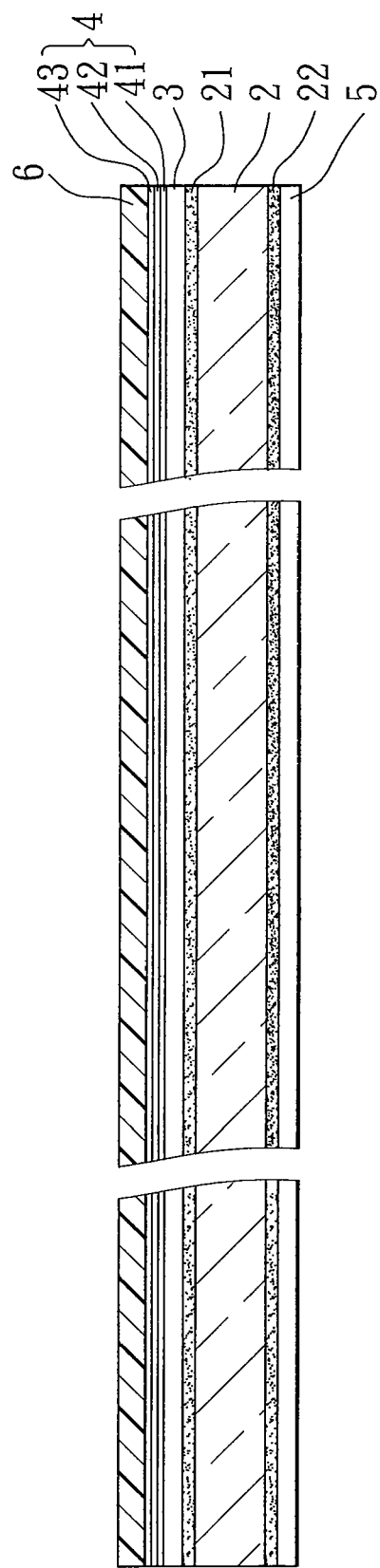
FIG. 6 is a fragmentary sectional view of a glass-plastic composite made according to the preferred embodiment.

Referring to FIG. 6, the glass-plastic composite produced according to the aforesaid method includes the glass substrate 2 having the activated first surface 21 and the activated second surface 22 opposite to the activated first surface 21, the adhesive layer 3 bonded to the activated first surface 21 of the glass substrate 2, the pattern layer 4 bonded to the adhesive layer 3, the plastic layer 6 bonded to the binding layer 43 of the pattern layer 4, and the top layer 5 formed on the activated second surface 22 of the glass substrate 2.

Additionally, when a glass-plastic composite having a curved configuration is to be produced, a glass substrate having the desirable curved configuration is prepared and used in the aforesaid preferred embodiment.

In view of the aforesaid, the plastic layer 6 is integrally bonded to the glass substrate 2 via injection molding in the method of the present invention. The method for making a glass-plastic composite of the present invention is relatively simple and inexpensive as compared to the aforesaid conventional method. Furthermore, in the method of the present invention, the surfaces 21, 22 of the glass substrate 2 are activated prior to bonding of the plastic layer 6 to the glass substrate 2 via the binding layer 43 of the pattern layer 4 or the adhesive layer 3 (when the pattern layer 4 is not included) using injection molding. Therefore, the bonding strength between the plastic layer 6 and the glass substrate 2 is enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for forming a glass-plastic composite, comprising the steps of:
    activating a first surface of a glass substrate;
    applying a light-transmitting adhesive material on the first surface that has been activated to form a light-transmitting adhesive layer on the first surface;
    forming a pattern layer on the light-transmitting adhesive layer; and
    placing the glass substrate together with the light-transmitting adhesive layer and the pattern layer in a mold, and injection molding a plastic material over the light-transmitting adhesive layer.

2. The method as claimed in claim 1, further comprising the steps of:
    activating a second surface of the glass substrate; and
    forming a top layer on the second surface that has been activated.

3. The method as claimed in claim 2, wherein the first and second surfaces of the glass substrate are activated by a process independently selected from the group consisting of:
    i) an etching treatment;
    ii) a plasma treatment;
    iii) an ultraviolet treatment;
    iv) a dipping treatment with a chemical agent; and
    v) a coating treatment with an activation agent.

4. The method as claimed in claim 2, wherein the top layer is formed by a process selected from the group consisting of screen printing, digital jet printing, and spray coating.

5. The method as claimed in claim 1, wherein the pattern layer includes a pattern portion formed on the light-transmitting adhesive layer, a background color layer formed on the pattern portion, and a binding layer formed on the background color layer.

6. The method as claimed in claim 5, wherein the pattern portion and the background color layer are formed by a process selected from the group consisting of digital jet printing, screen printing, and sublimation transfer-printing.

7. The method as claimed in claim 5, wherein the binding layer is formed by a process selected from the group consisting of digital jet printing, screen printing, and spray printing.

8. The method as claimed in claim 5, wherein the binding layer is made of a material selected from the group consisting of urea-formaldehyde resin, acrylate resin, hot melt adhesive, epoxy resin, amino resin, phenolic formaldehyde resin, UV curing resin, vinyl ester resin, polyvinyl acetate, polyurethane, melamine-formaldehyde resin, and combinations thereof.

9. The method as claimed in claim 1, wherein the light-transmitting adhesive material is selected from the group consisting of urea-formaldehyde resin, acrylate resin, epoxy resin, UV curing resin, and combinations thereof.

10. The method as claimed in claim 1, wherein the light-transmitting adhesive layer is formed by a process selected from the group consisting of screen printing, digital jet printing, spray coating, and dipping.

* * * * *